C. JASS.
SEED PLANTING MECHANISM.
APPLICATION FILED MAR. 13, 1911.
1,023,894.
Patented Apr. 23, 1912.
2 SHEETS—SHEET 1.
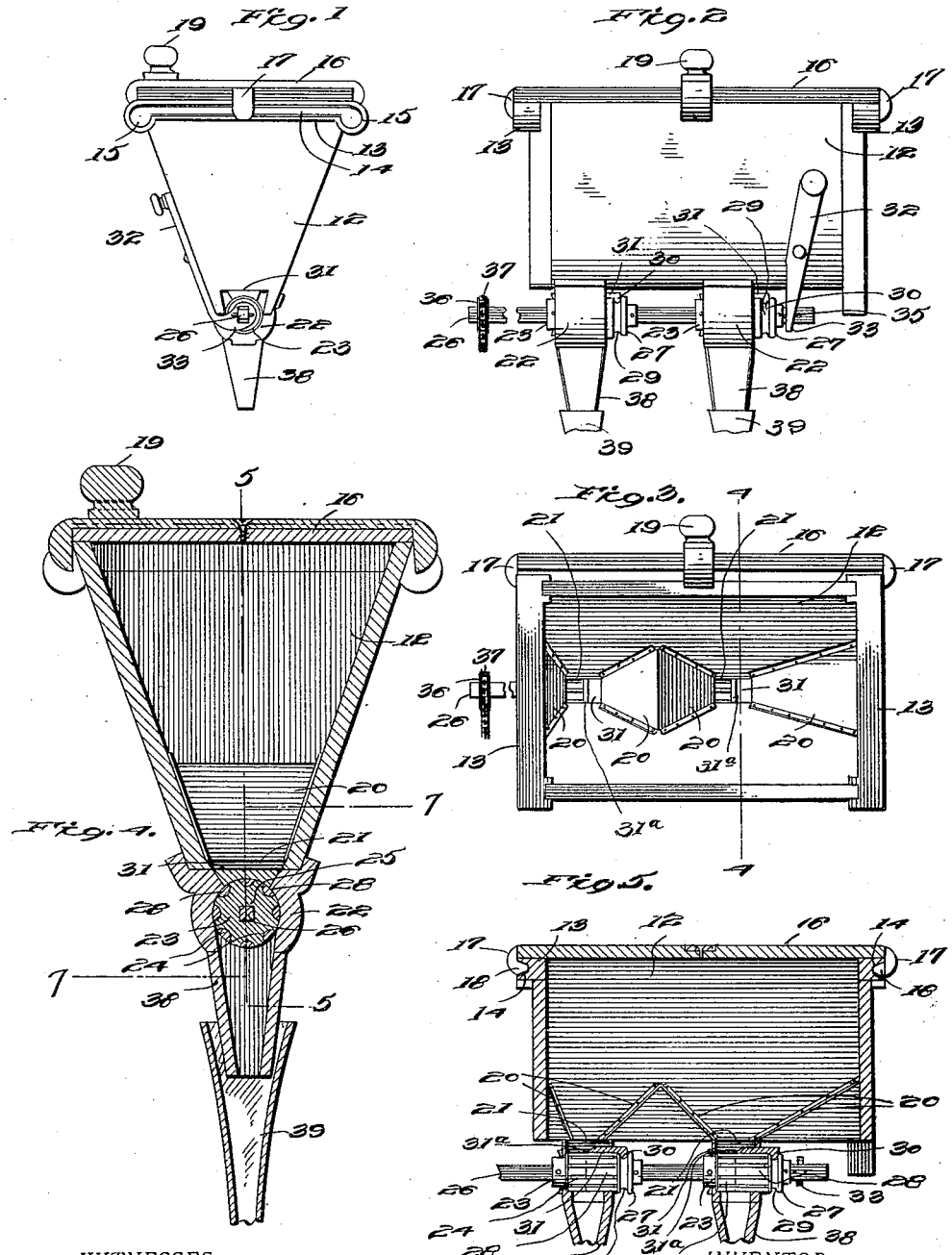
WITNESSES
INVENTOR
Carl Jass
his Attorney.

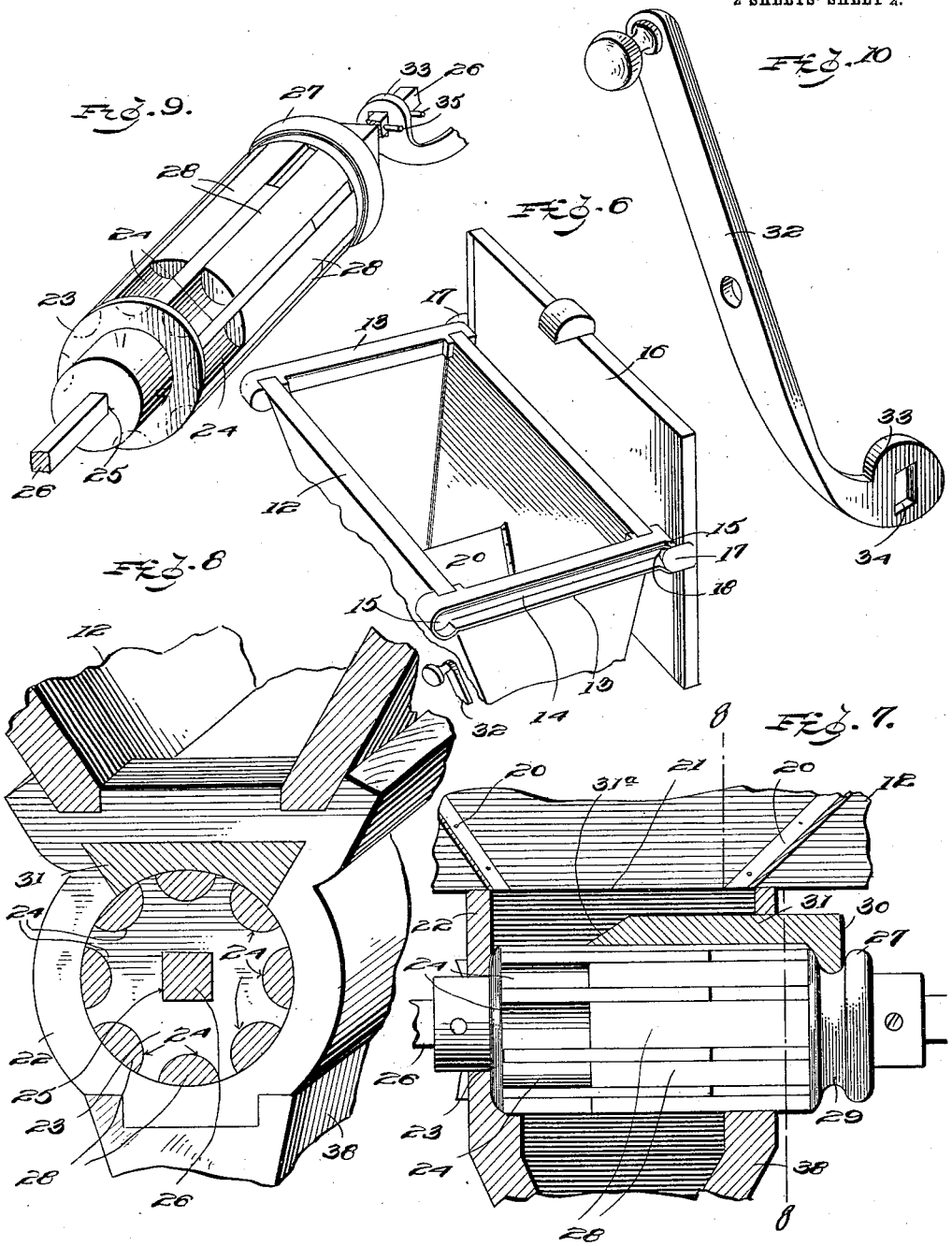

UNITED STATES PATENT OFFICE.

CARL JASS, OF HORICON, WISCONSIN.

SEED-PLANTING MECHANISM.

1,023,894. Specification of Letters Patent. Patented Apr. 23, 1912.

Original application filed May 27, 1909, Serial No. 498,596. Divided and this application filed March 13, 1911. Serial No. 614,063.

*To all whom it may concern:*

Be it known that I, CARL JASS, a citizen of the United States, residing at Horicon, in the county of Dodge and State of Wisconsin, have invented certain new and useful Improvements in Seed-Planting Mechanism, of which the following is a specification, reference being had therein to the accompanying drawing.

This invention relates to seed planters of the type shown in my co-pending application, Serial Number 498,596, filed May 27, 1909, and the principal object of the same is to provide simple means for controlling the planting of the seed, so that the amount of seed placed in the soil may be varied at the will of the operator.

A preferred and practical embodiment of my invention is shown in the accompanying drawings wherein:—

Figure 1 is a view in end elevation of the seed dropping mechanism. Fig. 2 is a rear view thereof. Fig. 3 is a top plan view, the cover being shown in an open position. Fig. 4 is an enlarged vertical transverse sectional view taken on the line 4—4, Fig. 3, the cover being shown in a closed position. Fig. 5 is a fragmentary vertical longitudinal sectional view taken on the line 5—5, Fig. 4. Fig. 6 is a fragmentary detail perspective view showing the manner of connecting the cover to the hopper. Fig. 7 is a fragmentary vertical longitudinal sectional view taken substantially on the line 7—7, Fig. 4 showing in elevation one of the droppers of the hopper. Fig. 8 is a detail fragmentary sectional view of the hopper and dropper, taken on the line 8—8 Fig. 7. Fig. 9 is a detail perspective view of one of the droppers. Fig. 10 is a detail perspective view of the operating lever for controlling the operations of the droppers.

This application is a division of my pending application referred to in the foregoing and it comprises seed planting means that include a hopper 12, the upper portion of which is equipped with external end strips 13 provided with longitudinal grooves 14 that terminate in enlarged rounded end recesses 15. A cover 16 has its ends provided with centrally located pendent ears 17 which carry inwardly projecting lateral lugs 18 that slidably engage the grooves 14 and can be rotated in the end recesses 15. A hand grip 19 is carried by the cover 16. As will be obvious, the lugs 18 and grooves 14 provide means whereby the cover 16 is slidably held over the hopper 12 and the end recess 15 and said lugs provide hinge connections upon which the cover can be rocked so that it will be entirely clear of the upper end of the hopper. Internally, the base of the hopper is provided with inclined plates 20 which are arranged so that two or more discharge outlets 21 are formed. Casings 22 depend from the outlets 21, and a discharge roller 23 is journaled in each casing. Said rollers are provided with longitudinal grooves 24. Each roller is provided with a central longitudinally extending opening 25, preferably rectangular, and through which the shaft 26 extends. The shaft 26 is of the same shape as the roller openings 25 so that relative rotation of the rollers and shaft is prevented, but said shaft can be moved longitudinally of said rollers. The grooves 24 of the rollers 23 are open at one end, and the shaft 26 has disks 27 fastened thereon from which arms 28 project laterally and telescope with the said grooves. The arms 28 are of the same length as the grooves 23, and it will therefore be obvious that by adjusting the shaft 26, the said arms will increase or decrease the capacity of the said grooves. The disks 27 are provided with peripheral grooves 29 that are engaged by the pendent end flanges 30 of cut-off slides 31 that are slidable through the casings 22 above the rollers 23, said slides being of the same length as the arms 28 so that when the said arms 28 are telescoped with the grooves 23, the slides will seal the outlets of the hopper. The free end 31ª of each cut-off is beveled so that seeds in the grooves 23 will not prevent the cut-offs being placed in position to seal the hopper outlets.

The shaft 26 is moved longitudinally to adjust the cut-offs 31 and arms 28 by means of a hand lever 32 that is pivotally connected to the rear of the hopper 12 and has its rear end equipped with a crank 33 that is provided with an opening 34 through which said shaft 26 extends. Keys 35 or other preferred abutments are carried by shaft 26 to prevent relative movement of said shaft and crank.

It will be clear from the foregoing that by manipulating the lever 32 the feed of seed to the soil can be readily controlled.

The shaft 26 is rotated by power taken from the planter by means of the sprocket and chain 36 and 37, shown in Figs. 2 and 3.

Chutes 38 depend from the casings 22 and carry the usual flexible tubes 39 that discharge seed into the drills.

What I claim as my invention is:—

A seeding mechanism for planters comprising a hopper, discharge casings carried thereby, a dropping roller rotatable in each casing, said roller being provided with longitudinal grooves, a shaft slidable through said rollers, a peripherally grooved disk fast on said shaft, adjacent to one end of each roller having arms telescopically engaging said grooves, a cut-off slide in each casing, each having a pendent end flange that engages the groove of a disk and means for moving said shaft longitudinally in said rollers to adjust said arms and slides.

In testimony whereof I hereunto affix my signature in presence of two witnesses.

CARL JASS.

Witnesses:
L. E. PLAGEMAN,
TYMAN P. BOUTON.

---

Copies of this patent may be obtained for five cents each, by addressing the "Commissioner of Patents. Washington, D. C."